(12) United States Patent
Cutter et al.

(10) Patent No.: US 10,517,283 B2
(45) Date of Patent: Dec. 31, 2019

(54) UNIVERSAL ARBOR FOR FISHING ROD BLANKS

(71) Applicant: Pacific Bay International, Inc., Sequim, WA (US)

(72) Inventors: Victor Cutter, Sequim, WA (US); Scott Whitmore, Port Angeles, WA (US); Jeff Price, Port Angeles, WA (US)

(73) Assignee: PACIFIC BAY INTERNATIONAL, INC, Sequim, WA (US)

( * ) Notice: Subject to any disclaimer, the term of this patent is extended or adjusted under 35 U.S.C. 154(b) by 442 days.

(21) Appl. No.: 15/399,521

(22) Filed: Jan. 5, 2017

(65) Prior Publication Data

US 2017/0215399 A1    Aug. 3, 2017

Related U.S. Application Data

(60) Provisional application No. 62/289,068, filed on Jan. 29, 2016.

(51) Int. Cl.
| *A01K 87/06* | (2006.01) |
| *B29C 65/48* | (2006.01) |
| *B29L 31/00* | (2006.01) |

(52) U.S. Cl.
CPC .............. *A01K 87/06* (2013.01); *B29C 65/48* (2013.01); *B29L 2031/7002* (2013.01)

(58) Field of Classification Search
CPC ........ A01K 87/00; A01K 87/02; A01K 87/06; A01K 87/08; Y10T 403/455;

(Continued)

(56) References Cited

U.S. PATENT DOCUMENTS

| 2,145,612 A | 1/1939 | Scogland |
| 3,197,908 A | 8/1965 | Hirsch |

(Continued)

FOREIGN PATENT DOCUMENTS

| CN | 101554147 B | 7/2012 | |
| FR | 1536443 A | * 8/1968 | ............. A01K 87/08 |

OTHER PUBLICATIONS

Machine Translation of FR 1536443, Mecanique Halieutique, https://worldwide.espacenet.com; generated Sep. 25, 2019 (Year: 1968).*

*Primary Examiner* — Daniel J Wiley
(74) *Attorney, Agent, or Firm* — Jacques M. Dulin, Esq.; Innovation Law Group, Ltd.

(57) ABSTRACT

Universal arbors mountable on tapered fishing rod blanks as non-degradable self-centering collars to which a reel seat may be mounted. The inventive cylinder-shaped arbor comprises a flexible thermoplastic resin formed as an outer cylinder, closed at one end with an integral end wall or separate disc/washer, which included a cylindrical hole to receive a rod blank. The annulus between the cylinder inner wall and the hole margin includes curved or straight centering fins secured to the cylinder inner wall that are free to flex. Flexing of the centering fins permits accommodating a wide range of blank tapers at the proper place of location of a reel seat making the arbor universal and positionally forgiving. Once the arbor is located on the blank and oriented properly, the cylinder is filled with a fluid epoxy resin, which when cured permanently secures the arbor to the blank and to the reel seat tube.

8 Claims, 4 Drawing Sheets

(58) Field of Classification Search
CPC ......... Y10T 403/4637; Y10T 403/7011; Y10T 403/7047; F16B 7/1445
See application file for complete search history.

(56) References Cited

U.S. PATENT DOCUMENTS

| | | | |
|---|---|---|---|
| 4,636,106 A | | 1/1987 | Waisbrod |
| 4,747,227 A | * | 5/1988 | Kress ..................... A01K 87/02 43/18.1 CT |
| 4,802,299 A | | 2/1989 | Ohmura |
| 5,263,275 A | * | 11/1993 | Rumbaugh ............ A01K 87/08 43/23 |
| 6,973,750 B1 | * | 12/2005 | Kim ..................... A01K 87/025 43/23 |
| 7,318,295 B2 | | 1/2008 | Pekin |
| 7,857,151 B2 | * | 12/2010 | Barrese .................. A47K 3/38 211/105.3 |
| 2010/0050495 A1 | * | 3/2010 | Brooks ............... A01K 87/007 43/4.5 |

\* cited by examiner

UNIVERSAL ARBOR FOR FISHING ROD BLANKS

CROSS-REFERENCE TO RELATED APPLICATION

This is the Regular Application corresponding to and based on prior U.S. Provisional Application Ser. No. 62/289,068 for the same invention filed by the same inventors on Jan. 29, 2016, the priority of which is claimed under 35 USC §§ 119 and 120.

FIELD

This invention relates to a universal self-centering arbor device for precisely mounting reel seats with respect to the blank of a fishing rod, both longitudinally and radially centered, so that the reel seats may be precisely and securely assembled to the rod blank, and which resist degradation due to infiltration of water during use.

BACKGROUND

Modern fishing rods are assembled in a multi-step process beginning with provision of a rod blank, which is a tapered core to which a suite of specialty parts are sequentially assembled. These parts include line guides, tops and tips, reel seats, trolling butts, grips, sleeves and tapes, hook keepers, butts and caps, gimbals and end plugs, to name the main ones.

Modern rod blanks are made of carbon, fiberglass or other fiber composites, that is carbon fibers embedded in a cured polyester or epoxy core. The resulting finished blanks are very smooth and taper continuously from the butt to the tip. Closer to the butt end, a reel seat must be secured to the blank. Since the blank is tapered, one solution has been to wrap masking tape around the blank until an annulus of suitable thickness is built up on which the reel seat assembly may be secured. This is a very time consuming and difficult procedure, and one that must be done with great care so that the built up tape annulus is the proper diameter and precisely located. One disadvantage is that the tape is of uniform thickness, so that the taper of the blank at that spot is replicated on the exterior surface of the tape annulus. A more serious disadvantage is that the tape has a short life, and is adversely affected by water or water vapor infiltrating into the layers during use. The annulus will degrade and the reel seat will loosen, making the rod unusable.

When using masking tape to create a built-up spacer for the reel seat, many windings of the tape are required to build up to the diameter needed for the reel seat. This is slow and labor intensive. The rod builder must ensure the tape is completely covered in epoxy; if it is not, then water will enter and eventually soak the tape. As a result the tape becomes first soggy and soon breaks down into mush. The reel seat becomes loose, mis-aligned (cockeyed) or detaches from the blank, resulting in a rod that cannot be used. To fix the problem, the rod must be disassembled and a new reel seat mounted on the blank. Rod repair is very expensive in time and cost.

Another solution has been to use a foam arbor. These are longitudinally elongated donuts having a constant diameter bore. It is very rare that the I.D. of the foam arbor bore is exactly the correct dimension to permit placing the reel seat at the correct location along the tapered blank. To size the bore of the foam arbor, current practice is to ream it out so that the I.D. of the arbor more closely matches the O.D. of the blank measured at the correct location along the length of the blank, This process is time consuming. Over-reaming is the norm, resulting in an arbor that is too loose to be used. The reaming process must be repeated on a new arbor. In addition, since the arbors have a longitudinal length, an arbor that fits snug facing the butt will be loose facing the tip due to the taper of the blank.

Further, during the reaming process, the I.D. of the bore easily becomes off-center in relation to the outside diameter, as this type of arbor is made of foam material. If an off-center-bored arbor is used to mount a reel seat, it results in an off-center seat, which has a negative effect on the performance of the finished fishing rod. A minor mistake early in the construction process is magnified in the end-product, leading to many "seconds" and reject rods.

Finally, there are some 15,000 to 20,000 differently tapered blanks available to the trade, each having a different taper along their length. Thus, arbor fitting is a one-of a kind process, dictated by the blank specifications.

Accordingly, there is an unmet need in the art to provide an arbor that is universal, that is, it accommodates a wide number of different blank tapers, has a bore that itself can taper, and is water resistant, thereby providing a more secure, permanent bushing for a reel seat.

THE INVENTION

The inventive self-centering universal arbor comprises a non-foam, unitary flexible polymer assembly comprising, in a first embodiment, an outer cylinder that is open at both ends, and in a second embodiment one end is partially closed by an integral bottom wall having a hole therethrough that is sized with a diameter that is slightly smaller than that of a tapered rod blank (also referred to as a core) at the point of location of the reel seat on the blank to retain glue to secure the arbor to the rod blank. The first embodiment may be described as an internally-finned sleeve with optional closure washer for one end. The second embodiment may be described as a cylindrical cup open at a first end, having internal fins, and an integral bottom wall at its second end, which wall includes a hole centered with respect to the circumference of the outer cylindrical wall. The first, sleeve embodiment is open at both ends and may employ a separate disc-shaped flexible element (washer) having a central hole that can serve as a retainer for securing glue when the disc is in contact with the sleeve. That is, the inventive arbor may be a single piece cup, or two-pieces: a sleeve plus optional flexible disc/washer for closing one end.

The interior of the cylinder in both embodiments includes a plurality of curved or straight ribs that function as centering fins so that the outer cylindrical surface of the arbor is radially equidistant from the rod blank axis. The ribs are secured to and project inwardly from the inner wall of the arbor cylindrical wall. The ribs are equi-angularly spaced apart from each other around the circumference of the cylinder, and project inwardly toward the central axis of the cylinder, but terminate short of the central axis so that they define a central cylinder (bore) to receive the rod blank. In the second cup-shaped embodiment, the ribs may also be secured to the interior face of the bottom wall. In the first embodiment, the bottom of the ribs are free standing, that is, not secured to the optional separate disc/washer bottom wall. The ribs terminate short of the central axis of the cylinder. In one embodiment, the ribs do not project inwardly beyond the diameter of the bottom wall hole or disc/washer hole. That is, in terms of geometry, the diameter of the hole, extended along a central axis of the arbor defines a cylindrical bore, and the ribs terminate adjacent to or at the outer surface of that bore cylinder. A pair of arbors are selected for mounting that have bore cylinders that are slightly smaller in diameter than the rod blank diameter at the point of mounting, so that when mounted on the rod blank, the ribs flex into contact with the outer surface of the rod blank to self-center the arbor with respect to the longitudinal axis of the rod blank.

The second embodiment of the cup, in having an integral bottom wall permits the inventive universal arbor to be slipped over the tip of the rod blank and pushed longitudinally down the length of the tapering blank until it is properly positioned for the reel seat assembly. The bottom wall, being flexible, provides a wiper seal with the surface of the blank and forms a dam to retain a liquid polymeric fluid glue while the glue is curing. An exemplary arbor flexible polymer which may be used is a thermoplastic resin that forms a strong bond with the glue, such as epoxy, which in turn forms a strong bond with the rod blank.

The disc/washer in one embodiment is planar, but may be concave or convex (depending on which side it is viewed-from). The first, sleeve embodiment may be used with or without one or more disc/washers to close one or both ends. Generally, it is more difficult to retain the glue in the sleeve without using a washer to close a lower end. However, the more fins in the sleeve, the easier it is to retain the glue without use of an end-closing disc/washer, as the more closely spaced the fins are, the more the glue will be retained between them by capillary action, depending on the nature of the glue and its viscosity. In addition, disc/washers may be used as closures at both ends of the sleeve. In use, a disc/washer is pushed down the rod blank into position, followed by a sleeve, the rod oriented vertically and the sleeve filled with glue, and a second disc/washer pushed down to close the top of the sleeve. Likewise, a disc/washer can be used to close the open end of a cup embodiment arbor after filling with glue.

With respect to the curved rib embodiment, as seen in an end view from the open end of the arbor sleeve or cup assembly, in one embodiment, the center line of each rib follows a generally geometric curve, such as an arc of a circle, a parabolic curve, a hyperbolic curve, logarithmic spiral, Fibonacci spiral, golden spiral, or the like, with the curve origin at or near the axial center of the bottom wall or disc hole. The center of the bottom wall or disc/washer hole is the intersection of the central axis of the arbor cylindrical outer wall and the plane of the bottom wall or disc/washer. Thus, the centering fins may flexibly fold outwardly toward the inner wall of the arbor cylindrical outer wall, that is, outwardly from the rod blank surface, during installation as the arbor is pushed down the tapered rod blank. This permits the arbor to snugly fit a large variance in rod blank O.D. measurements while providing a straight, cylindrical outer wall for reel seat mounting. During installation the free ends of the curved fins flex, and in the sleeve embodiment they may also pivot at their outer ends which are secured to the inner surface of the arbor cylindrical outer wall. The number of fins may be selected to provide uniform centering action of the outer cylindrical surface of the arbor on the tapering blank, along the length of the cylinder.

With respect to strait fins, they are oriented radially with respect to the central axis of the bore cylinder, and they may flex either direction as the arbor is pushed down the taperingly increasing diameter of the rod core. By rotationally twisting (rotating) the arbor sleeve or cup as it is pushed down the rod core, in the direction of the curvature of the fins, or in either direction in the case of radially straight fins, the flexing of the fin tips to provide proper centering is facilitated. The result is an arbor that engages and is retained by the rod blank at a particular predetermined location with the outer surface of the arbor cylinder properly centered so that the axis of the arbor and the axis of the rod core are essentially congruent, and the outer surface of the arbor is strait and cylindrical. A second arbor is pushed down the rod core, oriented with the two open ends of the arbors facing each other and positioned at a predetermined distance from the first that is suitable for receiving the tube of a reel seat assembly and for receiving and retaining glue so that the complete assembly may be cured with the reel seat in the proper position for a given rod core.

As a result of the flexing or/and bending action of the fins, the need to ream an arbor is eliminated. It also eliminates the mistake of over-reaming and reduces rejects. Indeed, the flexible fins rebound (readjust) even if the arbor is slid down the blank too far, and is then moved back up the blank to the correct position for reel seat mounting. The fins provide a self-centering action when the inventive universal arbor is placed on the blank and slid down to the correct location for reel seat mounting. Simply sliding the inventive universal arbor to the correct location on the blank creates a truly centered mount for the reel seat tube. The polymer resin of the inventive arbor completely eliminates the possibility of water damage causing a loose reel seat. Loosening is eliminated.

Thus, the inventive arbor is truly universal and forgiving, accommodating a wide range of blank tapers, yet the outer wall of the cylinder is parallel to the center line of the blank. As mounted on the blank in the correct position with the reel seat then slipped over the inventive arbors and into correct position, the inventive arbor forms a sleeve or cup into which the fluid glue, such as epoxy, is poured or injected and then cured. Once cured, the "potted" cylinder, that is the epoxy-embedded cylinder, is accurately and permanently positioned with the reel seat assembly secured to the hardened arbor assembly and the rod blank. As noted, the outer wall surface of the universal arbor is straight, that is, parallel to the center axis of the rod, rather than being parallel to the tapered surface of the blank. Multiple arbors are typically mounted on the rod blank, e.g., two or three, depending on the spacing size of the reel seats.

With respect to materials, the arbor sleeve, cup and disc/washer are presently preferred to be made of a flexible TPR (thermoplastic resin) not filled with carbon or glass fiber. Alternative materials include any suitable flexible castable or moldable resin, such as: PVC (polyvinyl chloride); polyurethane; PLA (polylactic acid); polyolefins, PETG (polyethylene triglyceride); PET (polyethylene terephthalate); ABS (acrylic-butadiene-styrene); elastomers such as: elastomeric polypropylene, polyacrylate, silicone, nitrile, fluorosilicone, nitrile such as Buna-N, SBR (Styrene-Butadiene Rubber), butyl, silicone rubber, EPDM (Ethylene Propylene-Diene Monomer), neoprene (chloroprene), and curable natural rubber. All of these materials must be able to be bonded to the rod material and to the sleeve of the reel seat by a suitable synthetic glue or adhesive material. The preferred glue/adhesive is a multi-part epoxy. Alternative glue/adhesives include: urethanes, cyanoacrylates, polyacrylates, phenol formaldehyde, epoxy, polyamides, polyester resins, methacrylates, and solvent cements.

BRIEF DESCRIPTION OF THE DRAWINGS

The invention is described in more detail with reference to the drawings, in which:

FIGS. 7A-7D are a set of optional layouts in plan view of the internal centering fins of the sleeve and cup embodiments from the open end of the inventive arbor, in which: FIG. 7A illustrates a standard curved fin embodiment with arrows indicating the direction of flex as the rod core is inserted through the bottom hole; FIG. 7B shows a second embodiment in which the fins are curved in a direction reversed from that of FIG. 7A and accordingly the flex is in the opposite direction; FIG. 7C shows radially oriented fins with flex shown going either direction; and FIG. 7D illustrates fins oriented tangentially to the central hole of the bottom wall or/and the separate disc/washer (lead line dashed);

FIGS. 8A-8C are a series showing the installation of inventive arbors on a tapered rod core blank, in which FIG. 8A shows two arbors properly spaced apart along a tapered rod core; FIG. 8B shows arbors that have been filled with epoxy to secure them to a tapered rod core; and FIG. 8C is a longitudinal section view through a tapered rod core blank after filling with epoxy to secure the sleeve of a reel holder.

DETAILED DESCRIPTION OF THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention. One feature may be shown in one drawing, and another feature is better shown in another drawing.

Figure 1:
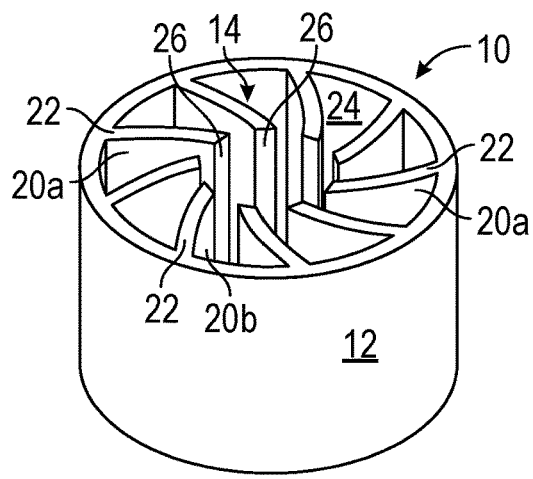
FIG. 1 is a ¾ isometric view from the top of the inventive universal arbor sleeve and cup embodiments illustrating the centering fins and an open end of the arbor.
Figure 2:
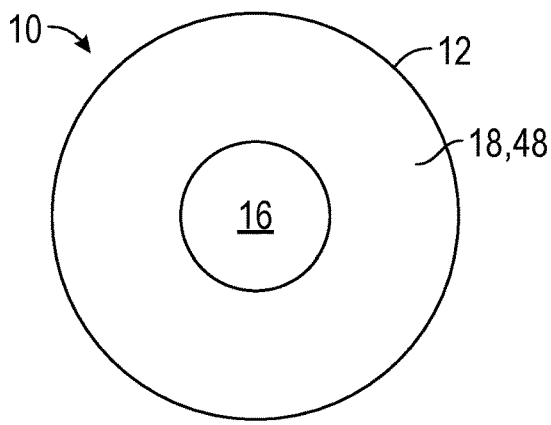
FIG. 2 is a bottom end elevation showing the integral bottom wall or separate disc/washer, both serving as an epoxy dam and each having a central hole to receive the rod blank.
Figure 3:
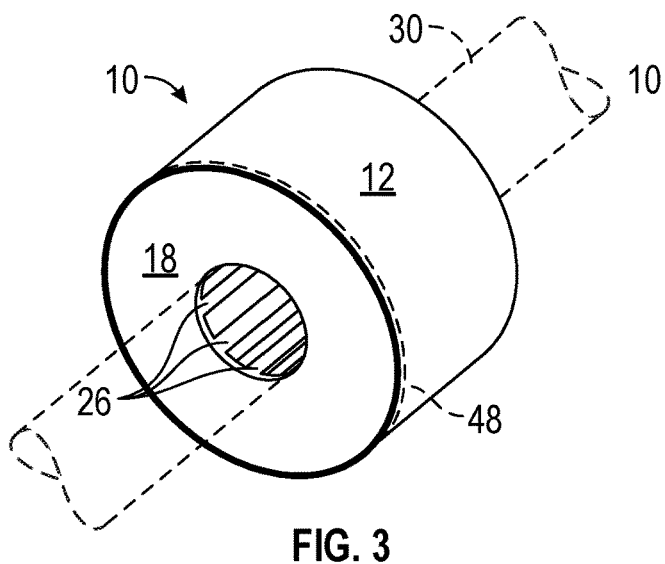
FIG. 3 is a ¾ isometric view from the bottom of the inventive universal arbor illustrating the outer cylinder, integral bottom wall or separate disc/washer (in phantom) serving as an epoxy "dam" having a central hole and fins visible through the hole, as well as a rod segment shown in phantom.
Figure 4:
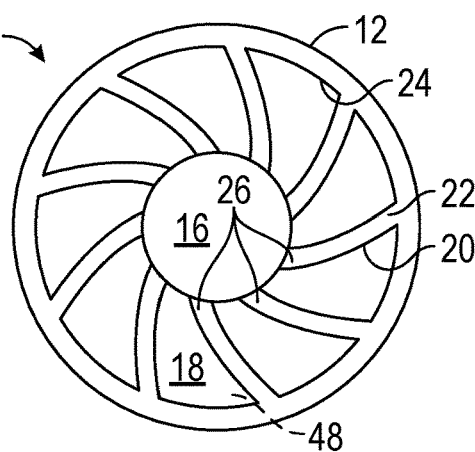
FIG. 4 is a top end elevation of either embodiment showing the configuration of the curved centering fins secured to the outer cylinder and terminating at or adjacent the margin of the hole.
Figure 5:
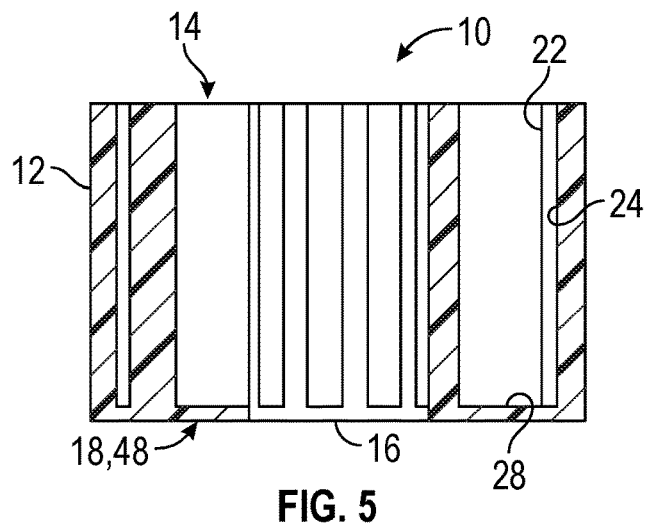
FIG. 5 is a diametric cross section in elevation showing the centering fins, epoxy dam and outer cylinder.
Figure 6:
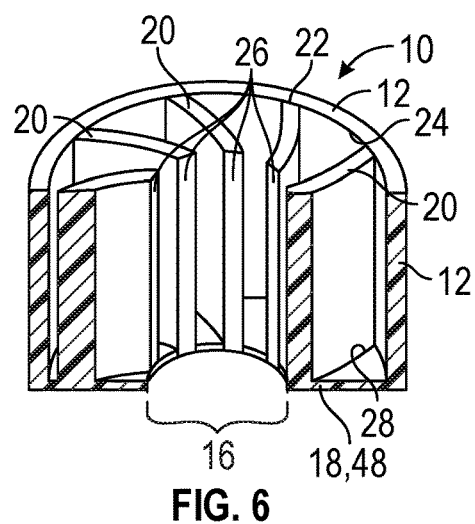
FIG. 6 is a ¾ isometric elevated cross section showing the curve of the centering fins, their join to the inner wall of the outer cylinder and optionally their join to the bottom wall dam at their bottom ends.

FIGS. 1-6 show an exemplary inventive universal arbor 10. FIG. 1 shows the universal arbor 10 in isometric view, formed from flexible plastic as a cylinder 12 with an open top 14, and having an aperture ("hole") 16 located centrally of a planar, integral bottom end 18 that is oriented transverse to a central axis of the cylinder (see FIGS. 2, 3, 4, 6). As best seen in FIGS. 1, 3 and 6, together, the cylindrical wall 12 and bottom wall 18 form a cup shape. The interior of the arbor cup includes a plurality of spaced centering fins 20a, 20b, . . . 20n having their outer ends 22 secured to the inner wall of the cylinder 24 (see FIGS. 4 and 6). The inner ends 26 of the centering fins terminate at or adjacent to, and define, a virtual cylinder whose diameter is generally equal to the diameter of aperture 16 (best seen in FIG. 3). As shown in phantom in FIG. 3, a rod core 30 is inserted through the hole 16. FIG. 3 also shows in dashed lines that the bottom may be a separate disc or washer 48, rather than integral to the arbor 10. In this embodiment\ the bottom of the fins 28 (see FIGS. 5 & 6) are not secured to the disc 48.

FIG. 2 shows the planar transverse bottom wall 18 or disc/washer 48 forming a dam for liquid epoxy resin when the fishing rod blank (see FIGS. 3 and 8A) is threaded through the hole 16 in the bottom of the end wall 18, 48. Note the fins do not extend into the cylindrical volume defined by the hole. That is, fins 20 terminate at or near the outer surface of the virtual cylinder whose diameter is that of the hole 16. FIG. 3 shows in isometric the outer cylinder 12, the bottom end wall epoxy dam 18 or disc/washer 48 and the hole 16 in the end wall 18, 48 through which the rod blank 30 (shown in phantom) is inserted. Some of the inner ends 26 of fins 20 can be seen through the hole. FIG. 4 shows in top (plan) view the curvature of the centering fins 20 that are secured to the inner wall 24 of the outer cylinder 12, and terminate with free ends at the margin of the hole 16 in the bottom epoxy dam wall 18 or disc 48.

FIG. 5 shows in vertical cross-section the centering fins 20 having their outer ends 22 secured to the inner wall 24 of the outer cylinder 14. In this embodiment, optionally the bottom ends of the 28 of the fins are secured to the bottom, inner surface of the epoxy dam transverse end wall 18. The bottom ends 28 of the fins 20 may be free, that is not secured to the inner surface of the bottom end when using a disc/washer 48. FIG. 6 shows in isometric cross-section the centering fins 20 having their outer edges 22 secured to the inner wall 24 of the outer cylinder 12, and their bottom ends to the bottom wall epoxy dam 3. When a disc/washer 48 is used, the bottom ends of the fins are free. Note the thickness of the individual fins collectively form a virtual cylinder that is an extension of the hole 16 (see FIG. 3). The inner ends of the fins 26 contact the surface of the rod blank 30 when the inventive universal arbor is slid down onto the rod core blank to the proper position to receive the tube 34 of the reel seat assembly (see FIGS. 8C and 9).

Figure 8A:
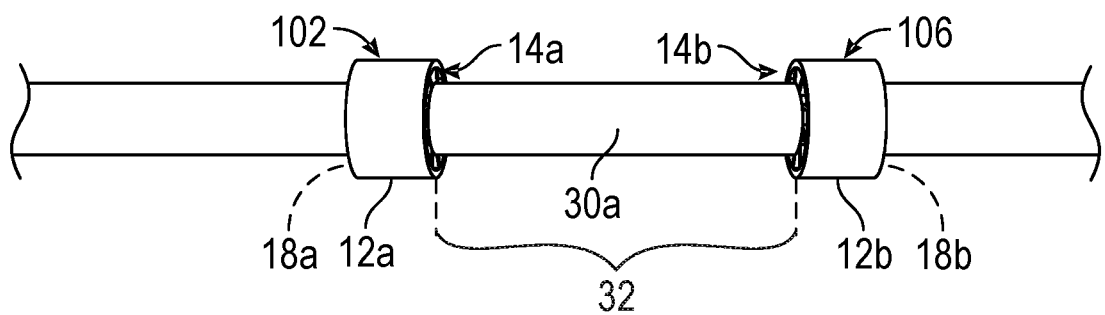
Figure 8B:
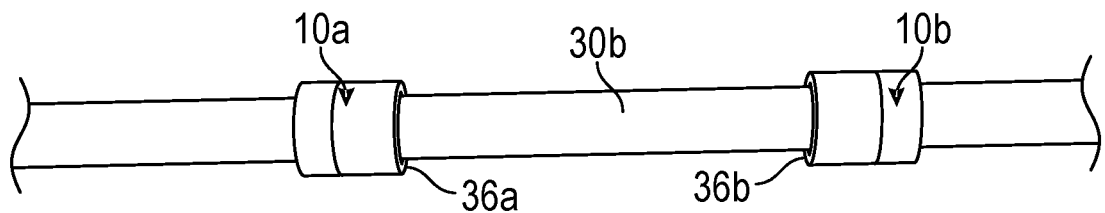
Figure 8C:
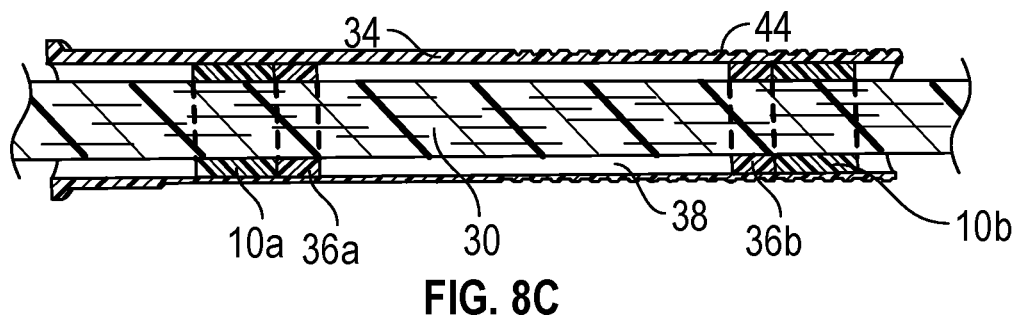

In the upright position shown in FIGS. 1, 5 and 6, once the inventive universal arbor 10 is slid down onto a rod blank 30 through the hole 16, it forms a cup to receive the liquid glue, such as epoxy, that, upon curing, permanently secures the arbor to the blank 30 and provides a smooth cylindrical exterior face to engage a reel seat assembly (best seen in FIGS. 8A-8C). The glue also secures the arbor to the inner surface of the reel seat tube 34.

Figure 7A:
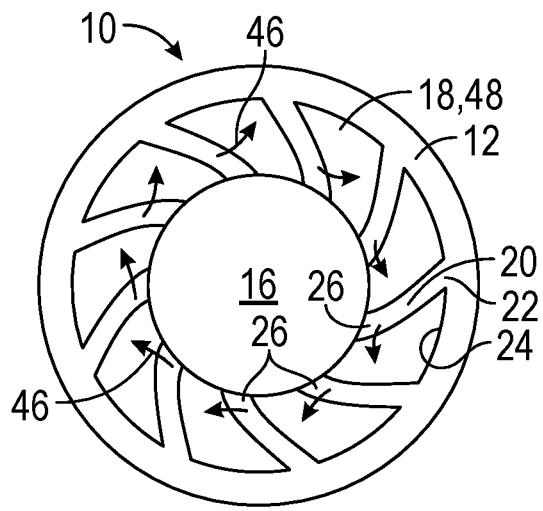
Figure 7B:
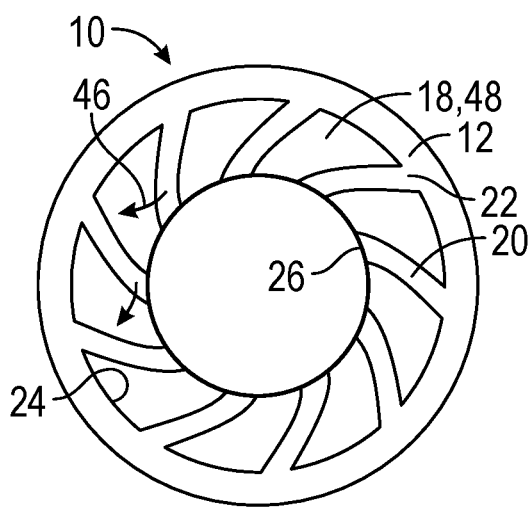
Figure 7C:
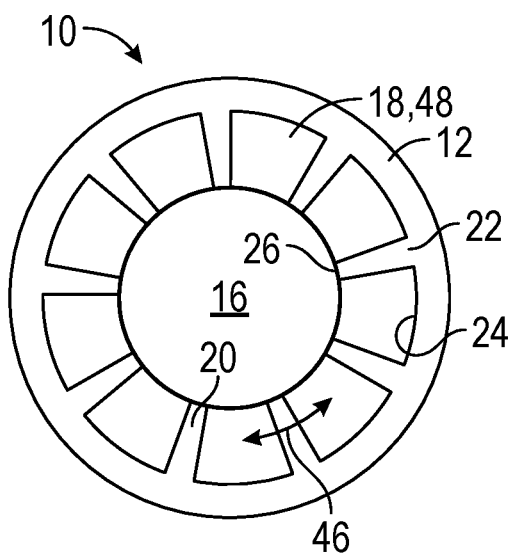
Figure 7D:
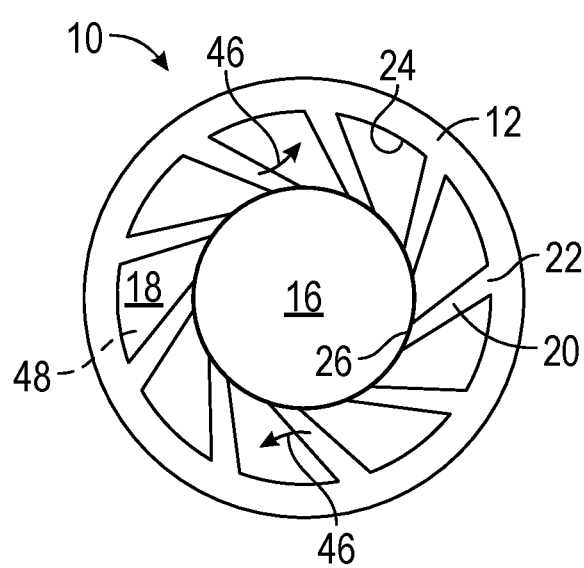

FIGS. 7A-7D are a set of layouts in plan view of alternative embodiments of the internal centering fins 20, seen from the open (upper) end 14 of the inventive arbor 10. FIG. 7A shows a standard curved fin embodiment as in FIG. 4, except that the center hole 16 is much enlarged for a larger diameter rod blank 30. The small arrows 46 show the direction of the flex of the inner ends 26 of the fins 20 as the arbor is slid down the rod blank 30 (see FIGS. 3, 8A and 9). FIG. 7B shows a second embodiment in which the fins 20 are curved in a direction (clockwise, seen from above), which is reversed from that of FIG. 7A (counterclockwise, seen from above). Again, arrows 46 show the flexing of the inner ends 26 of the fins 20 as the arbor is mounted on a rod blank 30. FIG. 7C shows an embodiment in accord with the principles of this invention having radially oriented fins 20. In this embodiment, double ended arrow 46 shows the fins are free to flex either clockwise or counterclockwise, depending on the direction of rotation of the arbor when mounting it on the rod blank. FIG. 7D illustrates an embodiment having fins 20 oriented tangentially (canted) to the central hole 16, and the arrows 46 show the direction of flex of the inner ends 26 of the fins 20.

FIG. 8A illustrates two of the inventive universal arbors 10a and 10b slipped onto a rod blank 30a. In this embodiment, the rod blank 30a is fiberglass. The two arbors 10a and 10b are inserted so that their open ends 14a and 14b face each other, so that the end dams 18a, 18b, or the disc/washer 48, capture the epoxy in the arbor. The arbors are spaced apart a preselected distance 32 so that they provide spaced support for the tubular reel seat tube 34 (see FIG. 8C) which is slipped over and engages the exterior surface of the cylindrical arbor outer wall 12a, 12b. FIG. 8B shows two arbors 10a and 10b fitted onto a rod blank 30b, which in this case is carbon fiber. Note the rod blank is larger in diameter and the arbors are spaced farther apart to accommodate a larger reel seat tube (not shown). In this embodiment, both of the arbor cups have been filled with epoxy at 36a, 36b to illustrate how they are secured to the rod. The space between the arbors is not filled with epoxy, but may be, if desired. FIG. 8C shows a finished assembly of a rod blank 30, glue-secured arbors 10a, 10b and reel seat tubular sleeve 34, that has been cut in two longitudinally in order to show the location of the arbors 10a and 10b recessed into the ends of the sleeve 34, and having the arbors bonded to both the rod core 30 and to the reel seat tubular sleeve 34 by the epoxy 36a, 36b. The space 38 between the inner face of the sleeve 34 and the outer face of the blank 30 may be left empty, partially filled with epoxy, or completely filled with epoxy.

Figure 9:
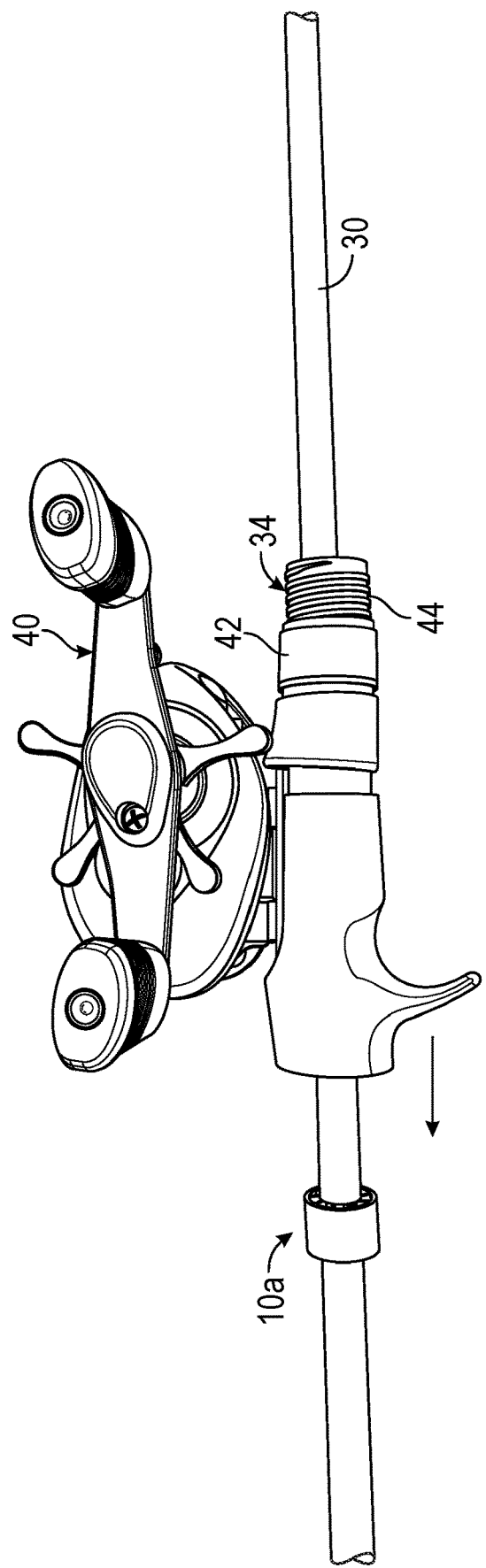
FIG. 9 shows a reel holder in process of being slipped down a rod core blank to engage the inventive arbors; a reel is shown mounted in the reel holder.

FIG. 9 shows the reel seat sleeve 34 being fitted over spaced arbors, the lower arbor 10a being shown exposed, as the sleeve has already been slid over the upper arbor 10b (not seen). In this position, the rod can be turned vertical, and epoxy introduced into the cup of arbor 10a, and then the sleeve 34 is slid down and properly seated over the lower arbor 10a. Then the upper arbor can be injected with epoxy to complete the assembly. This figure also shows a reel 40 has been fitted onto the reel holder, and a reel foot-retaining ferrule 42 screwed down tight on the threads 44 on the exterior of the holder tube to retain the reel in place.

INDUSTRIAL APPLICABILITY

The inventive universal arbor of this application has wide applicability to the fishing industry, namely to rod building suppliers and rod manufacturers. The inventive arbor assembly is clearly universal and accommodating, and a significant and substantial time-saver in precision of rod construction. Thus, the inventive universal arbor has the clear potential of becoming adopted as the new standard for apparatus and methods of manufacture of fishing rods.

It is clear that various modifications within the scope of this invention can be made by one of ordinary skill in the art without departing from the spirit thereof and without undue experimentation. For example, the fin curvature and points of securement to the interior of the cup (cylinder or/and bottom end wall of the arbor) can have a wide range of designs to provide centering functionality. Likewise, the number of fins may be increased or decreased. The diameter of the hole in the bottom wall or disc/washer may be selected to provide a snug fit for a particular diameter of rod blank, or it may be a cross-slit, +, rather than a circular hole. This invention is therefore to be defined by the scope of the appended claims as broadly as the prior art will permit, and in view of the specification if need be, including a full range of current and future equivalents thereof.

The invention claimed is:

1. A universal arbor for fishing pole reel seat assemblies including a tubular component, comprising in operative combination:
   a. a generally cylindrical vessel for retaining a polymeric glue, said vessel including: a tubular side wall having a diameter, an exterior surface and an inner surface; a first end and a second end spaced from said first end, the distance between said ends defining the height of said vessel; said first end being open; and a central axis;
   b. when said vessel is oriented with said central axis vertical, said second end of said vessel is closed by a transverse generally planar bottom wall having an inner surface and an exterior surface, said transverse bottom wall having a central aperture there through for insertion of a tapered fishing rod blank and defining a cylindrical volume as said aperture is extended along said central axis, and space between said central aperture and said tubular side wall inner surface defining an annulus between an outer circumference of said aperture and said inner surface of said tubular side wall, as said annulus is extended along said central axis for the height of said vessel, defining an interior space of said vessel;
   c. a plurality of spaced, vertically upstanding centering fins connected to at least one of said inner surface of said tubular side wall and said bottom wall inner surface, at least a portion of said fins terminating proximate to said annulus;
   d. said vessel and centering fins comprising an elastomeric polymer so that said fins and bottom wall central aperture flex to accommodate a varying diameter of said tapered fishing rod blank when inserted through said central aperture of said bottom wall without substantially affecting the exterior surface diameter of said tubular side wall along its length; and
   e. said universal arbor permitting rapid, accurate mounting and proper location, on a range of fishing rod blanks having various tapers, of a reel seat assembly tube seated thereover, said universal arbor receivingly retaining in said interior space a polymeric glue to secure said reel seat assembly to said fishing rod blank, yet being impervious to water, which would otherwise result in movement of said reel seat assembly with respect to said fishing rod blank.

2. A universal arbor as in claim 1 wherein said centering fins are secured to at least said inner surface of said side wall.

3. A universal arbor as in claim 1 wherein said centering fins are secured to both said inner surface of said side wall and said inner surface of said bottom wall.

4. A universal arbor as in claim 1 wherein said centering fin shapes as seen in plan view from said open first end are selected from curved and radially oriented straight shapes.

5. A universal arbor as in claim 1 wherein an inner edge of said centering fins terminates adjacent said cylindrical volume.

6. A universal arbor as in claim 1 wherein said bottom wall aperture is sized smaller than the diameter of a fishing rod blank at the location where the arbor is to be placed on said blank in order to provide a seal to retain a polymer glue introduced into said cylinder to secure said arbor to said fishing rod blank and on which said reel seat assembly tube is seated and secured.

7. A universal arbor as in claim 6 wherein said polymer glue is a multi-part epoxy glue.

8. A universal arbor as in claim 1 wherein said elastomeric polymer is a thermoplastic resin.

\* \* \* \* \*